June 21, 1955     G. L. MATHESON ET AL     2,711,387
TREATING SUBDIVIDED SOLIDS
Filed Nov. 30, 1949
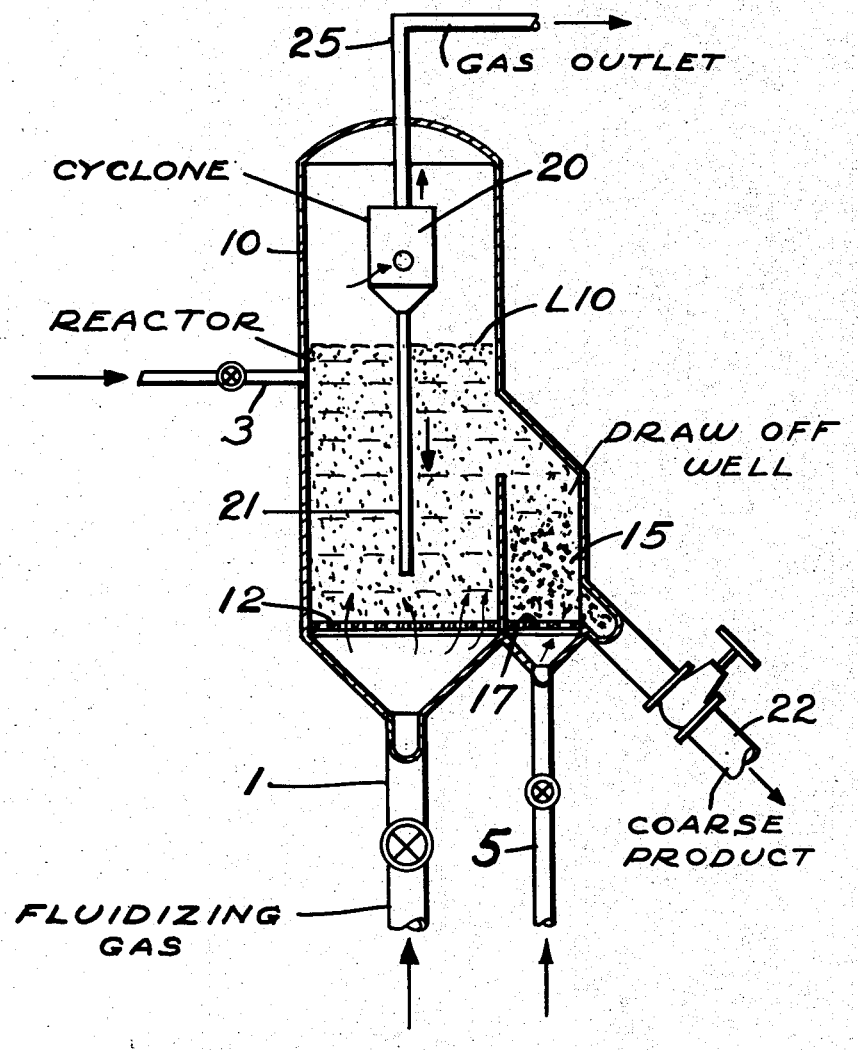
George L. Matheson
Homer J. Hall   Inventors
By J. Cashman Attorney

United States Patent Office 2,711,387
Patented June 21, 1955

2,711,387

TREATING SUBDIVIDED SOLIDS

George L. Matheson, Union, and Homer J. Hall, Cranford, N. J., assignors to Esso Research and Engineering Company, a corporation of Delaware Application November 30, 1949, Serial No. 130,216

6 Claims. (Cl. 202—14)

The present invention relates to the treatment of subdivided solids. More particularly, the invention pertains to a method of contacting subdivided solids with upflowing gases at gas flow velocities adapted to maintain the subdivided solids in the form of a highly turbulent ebullient mass resembling a boiling liquid. In its more specific aspects, the invention is directed to the fluidization of relatively coarse solid particles, having particle sizes of about 500 microns and more in such a manner that stratification or the formation of gas slugs in the fluidized mass and resulting fluidization troubles are avoided.

Prior to the present invention subdivided solids have been contacted with gases in a quasi-liquid or fluidized state by passing the gases upwardly through, and uniformly distributed over the cross-sectional area of, a contacting zone containing a body of the subdivided solids. This quasi-liquid fluidized state involves a rapid circulation of the subdivided solids in all conceivable directions throughout the fluidized bed.

Numerous important advantages result from this type of fluidized solids handling. The contact between gases and solids, as well as between individual solid particles is considerably improved as compared with other types of gas solids contacting such as fixed or moving bed or operating with a true dispersed suspension. Also, substantially uniform temperature may be maintained throughout a fluidized bed of solids because of the rapid circulation and high turbulence of the solids within the bed which result in an extremely efficient transfer of heat from particle to particle and between different sections of the bed. For the same reasons heat may be added to, or extracted from, a fluidized solids bed with the greatest of ease and uniformity.

Fluid operation has been successfully employed in many chemical catalytic and non-cataylitc processes, as well as physical separation processes. However, there are certain inherent limitations in this technique which have limited its efficiency in some of the fields for which it has offered substantial promise.

One of these limitations results from the difficulties encountered in the fluidization of subdivided solids containing substantial proportions of coarse particles of more than, say, 500 microns size. When it is attempted to fluidize solids of this type in reactors having a ratio of height to diameter of, say, about 2 or more, gas slugs are formed, i. e. large bubbles of substantially solid-free fluidizing gas, which pass upwardly through the reaction chamber and disrupt the uniformity of the solids distribution throughout the reaction zone.

The importance of this problem becomes apparent from the fact that the solids charged to numerous gas-solids contacting processes, to which the fluid solids technique as such is very well suited, are recovered from natural deposits or from processes of preparation in the form of masses of subdivided solids containing substantial proportions of coarse particles along with readily fluidizable particles in the size range of, say, 0–400 microns. An outstanding example for such processes is the carbonization or gasification of coal. Waste coal obtained in the course of conventional coal mining processes is composed of particles varying in size from a few microns to as much as five or more millimeters, the particle size distribution being substantially continuous over the entire range, i. e., particles of all intermediate sizes being present. Similar conditions prevail for other minerals such as limestone, various ores, etc. which require treatment with gases for burning, roasting, reducing or steam refining treatments. Attempts of carrying out such gas treatments in the fluidized state have frequently encountered serious difficulties as the result of excessive slug formation. The present invention avoids these difficulties.

The present invention is based on the surprising discovery that slug formation in fluidized beds containing substantial proportions of particles larger than 500 microns and particles within the range of 0–500 microns is a direct result of a "continuous" particle size distribution, i. e. the presence of particles of all size ranges intermediate between the smallest and largest component particles. It has been found that no slugs are formed and uniform fluidization may be maintained when a major proportion of the particles are within the lowest size bracket, for example from about 0–200 microns, or from 10–150 microns, and a minor proportion of the particles are larger than about 500 microns size, to the substantial exclusion of all intermediate particle sizes. The linear superficial flow velocity of the fluidizing gas must be sufficient for an incipient fluidization of the coarsest component particles in the absence of fine particles. It has further been found that this slug-free particle size distribution is largely independent of the true density of the solids involved, the latter affecting merely the fluidizing gas velocity required for proper fluidization.

More specifically, it has been found that in order to avoid slug formation in fluidized solids beds containing substantial proportions of coarse particles above about 500 microns size, such beds should contain not substantially more than about 35% by volume of said coarse particles. If this limit is exceeded, the coarse particles lock together, giving rise to poor fluidization. The remainder of the bed should consist of particles not substantially larger than about 200 microns. Specifically, not more than 10% of the fine fraction or 10% of the coarse fraction should be in the 200–500 micron range. The ratio of the minimum diameter of the coarse particles to the maximum diameter of the fine particles should be at least $2\frac{1}{2}:1$, and is preferably not less than $4:1$. Preferred ranges are about 10–30% by volume of the coarse particles having sizes larger than about 600 microns and 70–90% by volume of particles having sizes smaller than about 150 microns, with substantially no particles present in the 150–600 micron range. As previously stated, the superficial linear velocity of the fluidizing gas depends somewhat on the true specific gravity of the solids. In general, it may be stated, however, that superficial linear gas velocities of about 1.0–3 ft. per second are adequate properly to fluidize such solids as coal, coke, shale, various ores and the like, although higher velocities may be employed in the treatment of very coarse or dense solids.

The following example will further illustrate the present invention.

Example

A silica-alumina gel catalyst, containing about 12% by weight of alumina and having a specific gravity of about 1.0 was ground to various particle sizes varying from 0 to about 850 microns. From this material two blends were prepared as follows: (a) a blend in accordance with the invention, containing 80 vol. percent of material passing through 100 mesh or of less than 149 microns particle size and 20 vol. percent of material on 20 x 30 mesh or of 590–840 microns particle size; (b) a blend of "continuous" particle size distribution, having a composition which was calculated to be as follows:

| Mesh | Microns | Vol. Percent |
|---|---|---|
| 20 x 30 | 840–590 | 20 |
| 30 x 50 | 590–297 | 24 |
| 50 x 100 | 297–149 | 26 |
| Thru 100 | 149 | 30 |

Both blends were tested in a 1 inch inner diameter glass column at a settled bed depth of the solids of 1 ft., using air as the fluidizing gas at a superficial linear velocity of 1.25 ft. per second. At these conditions blend (a) was uniformly fluidized without any slug formation, while blend (b) slugged badly.

It will be appreciated that the present invention affords a suitable means for the slug-free fluidization of subdivided solid masses containing coarse particles of more than 500 microns size in all concentrations. It is merely necessary to eliminate particles of intermediate size, say from 200–500 microns, from such mixtures and to adjust the concentration of particles of less than 200 microns, preferably 150 microns, to above about 65 vol. percent. In cases in which the solids to be treated consist predominantly or exclusively of coarser particles, the solids charge may be supplied continuously to a treating vessel containing a large excess of a solids mass consisting of particles of smallest size. This excess may be maintained by continuously withdrawing a portion of the fluidized mass, blowing fines from said portion back into the fluidized mass and recovering substantially exclusively coarse particles from said portion.

A system particularly adapted for carrying out the last named embodiment of the invention is diagrammatically illustrated in the single figure of the annexed drawing. The operation of the system will be forthwith explained using the carbonization of coal as an example. It should be understood, however, that the system may be applied in an analogous manner to the treatment of other subdivided solids in the fluidized state.

Referring now to the drawing, the numeral 10 designates a fluid type reactor provided in its lower portion with a gas distributing means such as grid 12. Reactor 10 is connected with a solids withdrawal and elutriation well 15 which, in its lower portion, is likewise provided with a grid 17. Gas-solids separation means such as one or more cyclones 20 may be arranged in the top of reactor 10.

In operation, reactor 10 may be supplied with coke having a particle size of minus 200 microns, say of about 150–0 microns. Sufficient coke of this particle size is placed into reactor 10 so that a fluidized highly turbulent coke bed having a more or less well defined upper level $L_{10}$ at a point above the inlet into withdrawal well 15 is formed when a gas is admitted through grid 12 at a superficial linear velocity of about 1–1.5 ft. per second. The coke charge may then be fluidized and brought up to a carbonization temperature of about 800°–900° F. by admitting superheated steam of about 1000°–1200° F. through line 1 and grid 12 into reactor 10 at the velocity specified above. Simultaneously, fresh run-of-mine slack coal consisting of about 95 vol. percent of particles of 500 microns or more and only about 5 vol. percent of 0–150 micron particles is supplied through line 3. The fine and coarse fractions can be introduced in any suitable manner, for example through line 3 or through fluidizing gas inlet 1, or a portion through each. The coarse material floats in the fluidized coke mass with the effect that it partakes in the extreme turbulence of the fluidized bed and in all other benefits of the fluidized state.

A portion of the fluidized mass flows from reactor 10 into well 15 wherein it is aerated by a second stream of superheated steam supplied via line 5 and grid 17. An amount of treated solids adequate to maintain the desired bed level and solids residence time in reactor 10 is withdrawn from well 15 via line 22. In order to maintain in reactor 10 at all times a desired particle size distribution of, say, about 25 vol. percent of plus 500 microns particles and 75 vol. percent of minus 150 microns particles, the superficial linear velocity of the steam or other gas in well 15 is reduced to an extent which permits the coarse particles to settle down while coke fines remain fluidized in well 15 or are returned from well 15 to reactor 10. The permanent presence of a large excess of coke fines has the additional advantage of preventing the fresh coal fed from agglomerating due to its passage through a plastic state in the course of being heated to carbonization temperature.

The gas velocity in well 15 may also be readily so controlled that all desirable stages between complete separation of coarse material and fines and uniform fluidization of coarse material and fines may be accomplished. In this manner, the solids withdrawn from the bottom of well 15 through line 22 may either be coarse material alone or any desired mixture of coarse and fine material whereby a proper control of the particle size distribution within reactor 10 may be accomplished. Depending on the elutriative effect desired, the superficial linear gas velocity in well 15 may vary within the approximate range of 0.3–1.5 ft. per second in the case of the present example.

A mixture of steam and volatile carbonization products passes upwardly from level $L_{10}$ and is withdrawn through line 25 preferably after separation of entrained solids in cyclone 20. Solids separated in cyclone 20 may be returned via line 21 to the fluidized bed in reactor 10. Alternately, the cyclone may be located outside of the shell of reactor 10 and the separated fines can be returned to the bed via line 3 or line 1.

The operation of the system of the drawing may be modified in various respects. Heat may be supplied to reactor 10 by internal or external heating means, such as heating coils or a heating jacket or by partial combustion supported within the fluid bed by admitting a free oxygen-containing gas through line 1 and grid 12 or by the circulation of hot heat-carrying solids between reactor 10 and a separate solids heater, all in a manner known per se. Other gases, such as nitrogen, flue gases, product gas from the carbonization process, etc. may take the place of steam as the fluidizing gas and/or heat carrier. Water gas may be produced in reactor 10 in an analogous manner by supplying steam through grid 12 and raising the temperature above about 1700° F. The burning of lime and the roasting or reduction of ores and various other solids treatments may be carried out in reactor 10 in a manner largely analogous to that described above. Other modifications will appear to those skilled in the art without deviating from the spirit of the invention.

The foregoing description and exemplary operation have served to illustrate preferred embodiments of the invention but are not intended to be limiting in scope.

What is claimed is:

1. In a method of contacting subdivided solids with a gasiform material to form a highly turbulent dense mass of solids resembling a boiling liquid and maintained in a fluidized condition by upwardly flowing gasiform material without stratification of coarse particles in said mass and having a ratio of height to diameter of not less than 2 and containing component solid particles having a particle size coarse enough to cause slug formation in a fluidized mass where the particle size range extends through the entire range from 0 to 500 microns and larger, the improvement which comprises maintaining in a contacting zone having a ratio of height to diameter of more than 2, a dense fluidized mass of solids consisting essentially of a major proportion of fine solid particles of less than 200 micron size and a minor proportion of coarse solid particles of at least 500 micron size, feeding subdivided solids consisting essentially of coarse solid particles of at least 500 micron size and finely divided solids of less than 200 micron size to said dense fluidized mass, adjusting the linear superficial flow velocity of said gasiform material to a value sufficient for an incipient fluidization of said coarse solid particles of at least 500 micron size in the absence of said finely divided particles of less than 200 micron size, and withdrawing a mixture of solids containing coarse particles and finely divided particles from said dense turbulent fluidized mass in said contacting zone.

2. A method according to claim 1 wherein the solids in said dense fluidized mass comprise coke.

3. In a method of contacting subdivided solids with a gasiform material to form a highly turbulent dense mass resembling a boiling liquid maintained in a fluidized condition by upwardly flowing gasiform material without stratification of coarse particles in said mass and containing component solid particles having a particle size coarse enough to cause slug formation in a fluidized mass having a ratio of height to diameter more than 2 where the particle size range extends from 0 to 500 microns and a substantial proportion of particles larger than 500 microns, the improvement which comprises maintaining in a contacting zone having a ratio of height to diameter of more than 2, a dense turbulent fluidized mass of solids consisting essentially of about 70 to 90% by volume of fine solid particles of less than about 200 micron size and about 10 to 30% by volume of coarse solid particles of at least 500 micron size, with substantial exclusion of particles in the range of 200 to 500 microns, feeding subdivided solids consisting essentially of coarse solid particles of at least about 500 micron size and finely divided solids of less than about 200 micron size to said dense extremely turbulent fluidized mass, adjusting the linear superficial flow velocity of said gasiform material to a value sufficient for an incipient fluidization of said coarse solid particles of at least 500 micron size in the absence of said finely divided particles of less than 200 micron size, and withdrawing a mixture of solids containing coarse particles and finely divided particles from said dense turbulent fluidized mass in said contacting zone.

4. A method according to claim 3 wherein the fine solid particles are of a size of 0 to 150 microns and the coarse solid particles are of a size of about 500 to 840 microns.

5. In a method of contacting subdivided solids with gasiform material to form a highly turbulent mass resembling a boiling liquid maintained in a dense fluidized condition by upwardly flowing gasiform material without stratification of coarse particles in said mass and containing component solid particles having a particle size coarse enough to cause slug formation in a fluidized mass having a ratio of height to diameter of more than 2 wherein the particle size extends throughout the range from powder to coarse particles above 500 microns, the improvement which comprises maintaining in a contacting zone having a ratio of height to diameter of more than 2, a dense fluidized turbulent mass of solids simulating a boiling liquid and consisting essentially of fine solid particles of less than about 200 micron diameter, feeding subdivided solids consisting essentially of coarse particles of at least about 500 micron size to said dense fluidized mass, adjusting the linear superficial flow velocity of said gasiform material to a value sufficient for incipient fluidization of said coarse solid particles of at least about 500 micron size in the absence of said fine solid particles of less than about 200 micron size, withdrawing from said contacting zone a mixture of subdivided solids containing coarse solid particles of at least about 500 micron size and fine solid particles of less than about 200 micron size from said dense fluidized mass into a solids fractionating zone, separating in said fractionating zone coarse solid particles of at least about 500 micron size from fine solid particles having less than about 200 micron size, withdrawing said separated coarse solid particles from said fractionating zone, returning said separated fine solid particles having less than about 200 micron size to said dense fluidized turbulent mass, and controlling the rates of coarse and fine solids feed and withdrawal to and from said dense fluidized turbulent mass in such a manner that the concentration of coarse solid particles of at least about 500 micron size in all portions of said fluidized turbulent mass is from about 10 to 30% by volume and the concentration of fine particles below about 200 micron size in all portions of said dense fluidized turbulent mass is from about 70 to 90% by volume.

6. In a method of contacting subdivided solids with a gasiform material in a contacting zone to form a highly turbulent dense mass resembling a boiling liquid and maintained in a dense fluidized condition by upwardly flowing gasiform material without stratification of coarse particles in said dense fluidized highly turbulent mass having a ratio of height to diameter of more than 2 and containing component solid particles having a particle size coarse enough to cause slug formation in a fluidized mass where the particle size extends throughout the range from powder to coarse particles above about 500 microns, the improvement which comprises maintaining the particle size distribution in said dense fluidized extremely turbulent mass having a ratio of height to diameter of more than 2 such that the coarse solid particles of a size larger than about 500 microns form about 10–30% by volume of said dense fluidized extremely turbulent mass and the fine solid particles smaller than about 200 microns form about 70–90% by volume of said dense fluidized extremely turbulent mass, said dense fluidized turbulent mass containing substantially no particles in the particle size range of about 200 to 500 microns.

References Cited in the file of this patent

UNITED STATES PATENTS

| | | |
|---|---|---|
| 1,801,195 | Fraser | Apr. 14, 1931 |
| 1,843,405 | Rau | Feb. 2, 1932 |
| 1,983,943 | Odell | Dec. 11, 1934 |
| 2,206,574 | Pearson | July 2, 1940 |
| 2,446,247 | Scheineman | Aug. 3, 1948 |
| 2,471,119 | Peck et al. | May 24, 1949 |
| 2,480,670 | Peck | Aug. 30, 1949 |
| 2,483,485 | Barr | Oct. 4, 1949 |
| 2,511,088 | Whaley | June 13, 1950 |
| 2,515,371 | Jewell | July 18, 1950 |
| 2,538,219 | Welty | Jan. 16, 1951 |
| 2,614,069 | Matheson | Oct. 14, 1952 |
| 2,627,499 | Krebs | Feb. 3, 1953 |
| 2,643,219 | Carr, Jr. et al. | June 23, 19593 |

FOREIGN PATENTS

| | | |
|---|---|---|
| 600,326 | Great Britain | Apr. 6, 1948 |

OTHER REFERENCES

"Fluidizing Processes," by Parent et al., Chemical Engineering Progress, vol. 43, No. 8, August 1947, pp. 429–436.